Sept. 13, 1966     W. H. McGLADE     3,272,274

VEHICLE

Filed Aug. 27, 1964     7 Sheets-Sheet 1

INVENTOR:
WAYNE H. McGLADE
BY
JOHN F. SCHMIDT

Sept. 13, 1966 W. H. McGLADE 3,272,274
VEHICLE
Filed Aug. 27, 1964 7 Sheets-Sheet 2

INVENTOR:
WAYNE H. McGLADE
BY
JOHN F. SCHMIDT

Sept. 13, 1966 W. H. McGLADE 3,272,274
VEHICLE
Filed Aug. 27, 1964 7 Sheets-Sheet 3

INVENTOR:
WAYNE H. McGLADE
BY
JOHN F. SCHMIDT

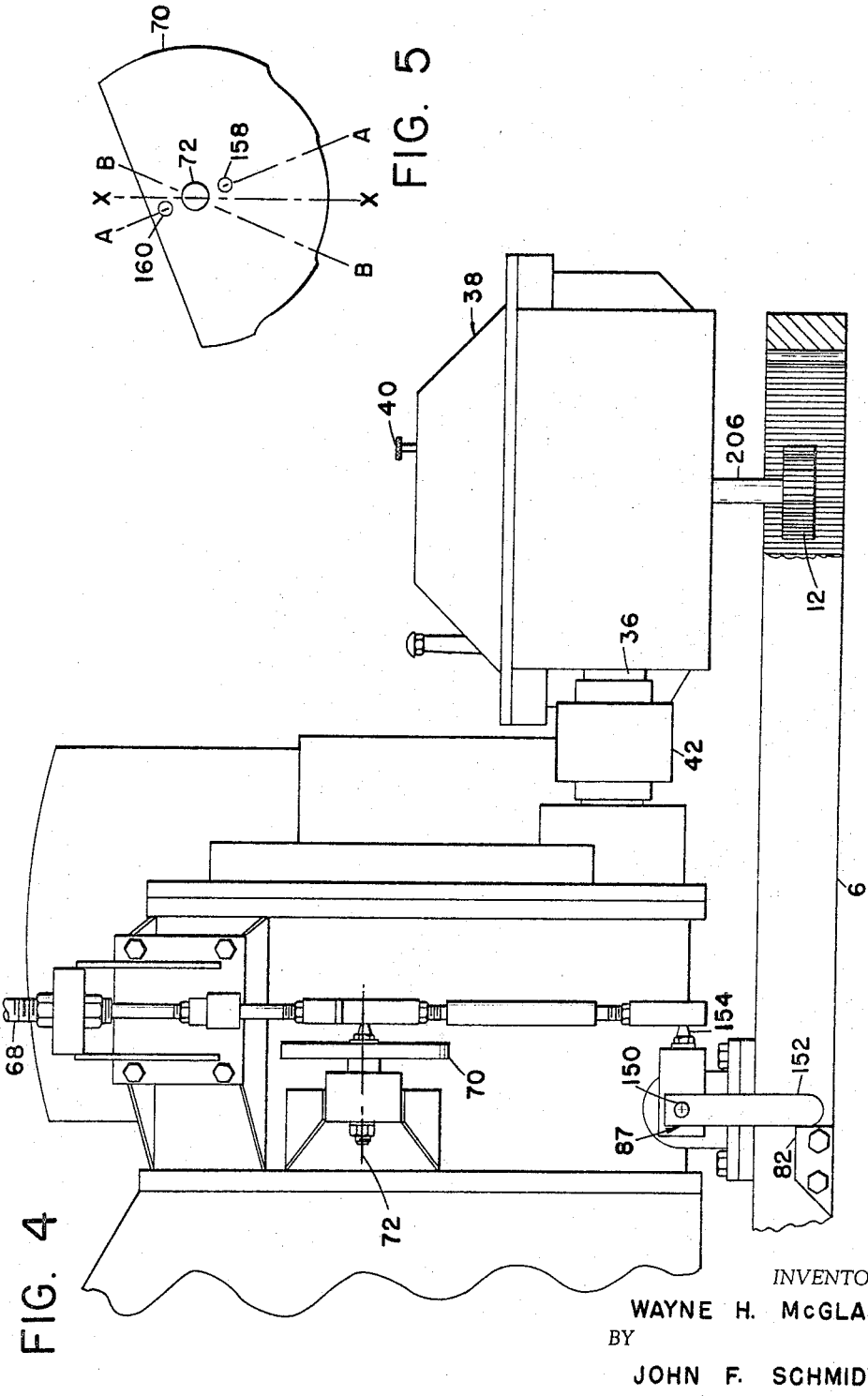

Sept. 13, 1966 W. H. McGLADE 3,272,274
VEHICLE
Filed Aug. 27, 1964 7 Sheets-Sheet 6

INVENTOR:
WAYNE H. McGLADE
BY
JOHN F. SCHMIDT

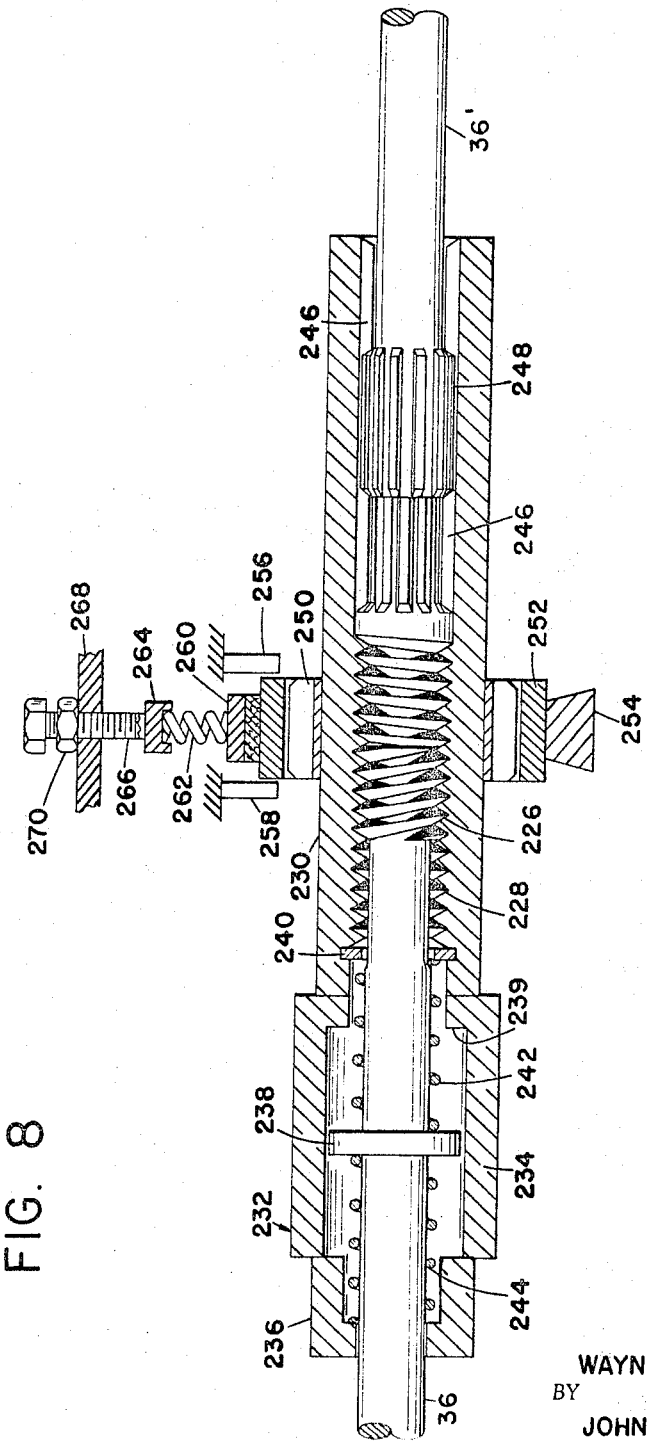

3,272,274
VEHICLE
Wayne H. McGlade, Peoria, Ill., assignor to LeTourneau-Westinghouse Company, Peoria, Ill., a corporation of Illinois
Filed Aug. 27, 1964, Ser. No. 392,446
11 Claims. (Cl. 180—79.4)

This invention relates to vehicles; more particularly, it relates to steering mechanism for vehicles.

The vehicles contemplated for this invention are generally of a large size, and are usually intended for off-highway operations; as such, they may include military equipment. Examples of off-highway vehicles of the type contemplated are shown in Patent 2,386,483, issued October 9, 1945, and in Patent 2,400,868, issued May 28, 1946, to R. G. LeTourneau. In some respects, this invention is an improvement in the steering mechanism shown in Patent 2,400,868, because that patent discloses a steering mechanism which is electrically powered.

Vehicles steered by the mechanism of Patent 2,400,868, referred to above, have enjoyed very substantial acceptance, but experience with such vehicles over a period of many years indicates that there is room for improvement in performance from a number of viewpoints. A more minute adjustment of the steering angle becomes desirable as vehicle speeds increase. Furthermore, even though Patent 2,400,868 discloses electric power steering, the steering motor runs only during steering, and the system has inherent inertia force problems which are not present in the new system wherein the electric steering motor runs constantly.

Equipment which operates off-highway often encounters unfavorable conditions because of the need to operate as many days as possible. Consequently, contractors often try to operate under marginal conditions, with the result that a machine may get into mud that is soft enough and deep enough to be troublesome. Getting out of mud involves a maneuver known as "walking," in which the tractor portion of the vehicle is steered from side-to-side as the drive wheels are powered. Such a tactic makes it possible to take advantage of the inertia of a power source that runs constantly; conversely, the "walking" maneuver is done less easily when the steering motor must be started and stopped repeatedly.

Although vehicles embodying this invention have many applications, the invention can be used to good advantage in military applications, which often include unfavorable terrain. Military vehicles may become disabled in combat areas, whereupon it becomes desirable for salvage or repair troops to hook onto the disabled vehicle quickly and tow it away to a repair area. Such an operation requires disconnecting the steering mechanism to allow the towed vehicle to respond readily to changes in direction by the salvage vehicle, or to enable loading of the disabled vehicle onto a carrier. If the salvage troops must retrieve the disabled vehicle in a combat area, disconnect of the steering mechanism should be possible in a minimum of time to avoid unnecessary exposure of the salvage troops to the hazards of combat.

It is accordingly an object of this invention to provide a vehicle steering mechanism that allows close control of the steering angle even at high vehicle speeds, and which permits extraordinary maneuverability of the vehicle in difficult terrain. A further object for vehicles subject to combat conditions is the possibility of quick disconnect of the steering mechanism of disabled vehicles to facilitate recovery by salvage personnel.

In the drawings:

FIG. 4 is another view of the power transmission means and its relationship to the operator-operable means as well as the relationship of the stop means to the aforesaid elements and to the large gear which is the last gear in the gear train operating the steering mechanism.

FIG. 5 is a view of the cam shown by itself and on the same scale as the cam is shown in FIG. 3.

FIG. 8 is a view in section of a self-locking device for the worm, this being an element which is shown schematically in FIG. 1.

Figure 1:
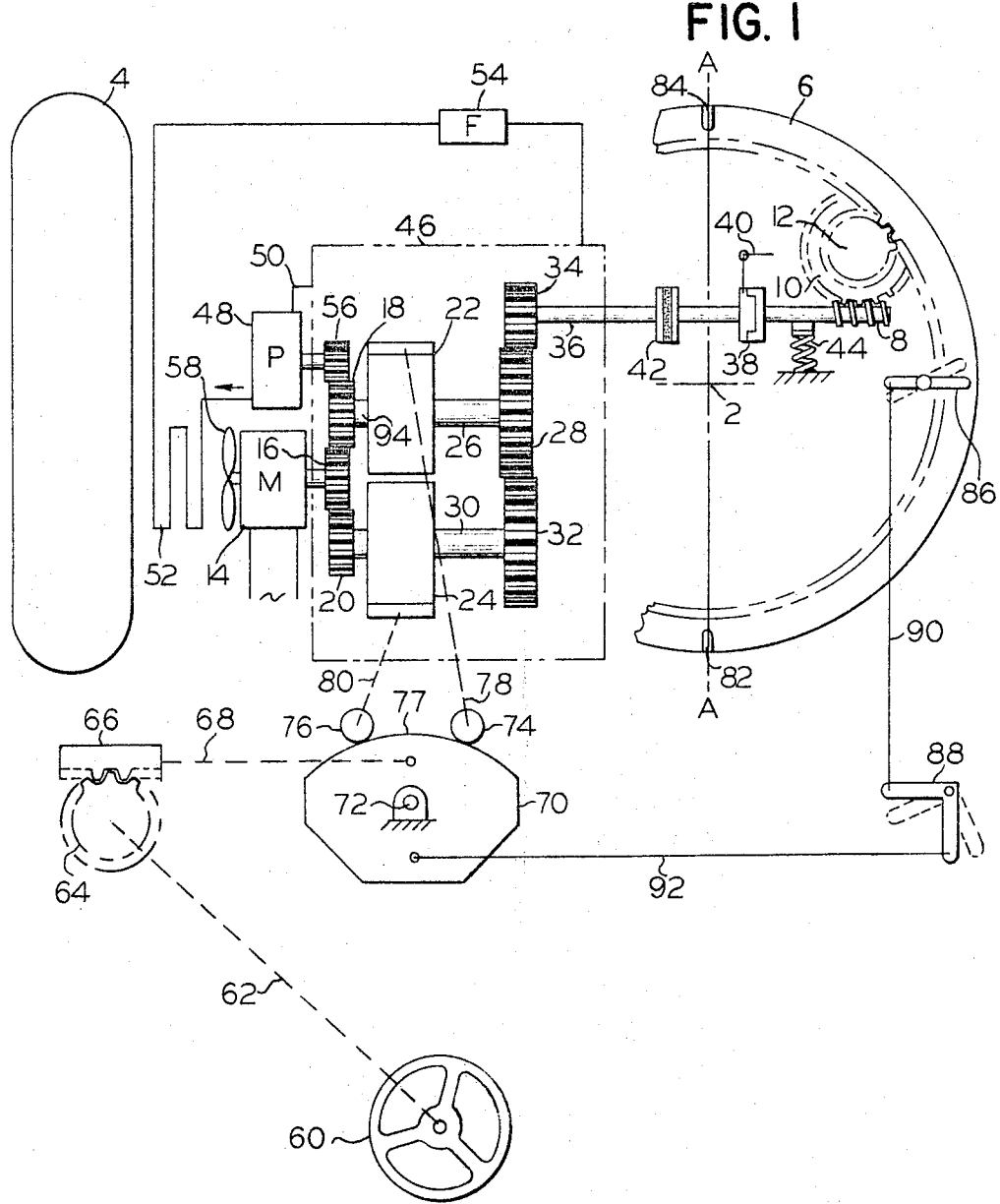
FIG. 1 is a schematic view of a vehicle embodying the invention, this view showing the elements of the invention in relation to each other.

Referring now to FIG. 1 for a brief discussion of the relationship of the elements of the invention to each other, it will be remembered that the invention relates to a vehicle of the general type shown in the two patents identified above. Such a vehicle comprises a two-wheel tractor and a two-wheel trailer, these two parts being articulated to rotate relative to each other about a vertical axis to accomplish steering. The vertical axis is shown in FIG. 1 at 2. The axis A—A is a fixed axis of the vehicle and represents the major axis of the vehicle when it is in a straight-ahead position. In other words, the axis A—A is parallel to the direction of motion when the vehicle is in its position for simple translatory motion whether this be straight-ahead or in reverse. In equipment of the type shown in the two patents identified above, the axis A—A is the long axis of the trailing unit, and the tractor unit pivots about axis 2 relative to axis A—A and the trailing unit. The ground engaging element shown at 4 is a pneumatic-tired wheel of a type which is conventional in equipment such as that shown in the two patents identified above. Ground engaging element 4 is of course dirigible by being movable through an arc about pivot axis 2. In the usual equipment of this type, there is another ground engaging element to the right of axis 2, spaced from that axis by a distance equal to the spacing of the element shown in FIG. 1.

In the usual equipment of the type described, a large gear 6 is mounted for rotation about axis 2, gear 6 being normally secured in such a manner as to turn with the tractor unit or element of the articulated vehicle. It is normal in equipment of this type for the gear 6 to be mounted to permit lateral tilt or oscillation to a limited extent about an axis parallel to the long axis of the tractor, or parallel to axis A—A when the tractor and trailing units are oriented in the normal straight-ahead relationship. The tilt axis will of course rotate with the tractor unit, and thus the tilt axis will be parallel to axis A—A only for the straight-ahead (or straight back) orientation of the tractor and trailing units.

It will further be understood by those skilled in the art that, of the elements shown in FIG. 1, only elements 4, 6, 60, 62, 64 and 66 are identifiable with the tractor unit; as far as rotation about axis 2 is concerned, those elements always maintain the relationship to the tractor unit shown in FIG. 1, and the remaining elements there shown remain at all times fixed in their position relative to the trailing unit.

One of the elements of the invention shown in FIG. 1 (and claimed) comprises driven means having a connection to change the orientation of the ground-engaging means relative to a fixed axis of the vehicle. From the foregoing description, the ground-engaging means here shown is the wheel 4, and the fixed axis referred to is the axis A—A. The driven means of the claimed combination can be taken as the shaft which drives the worm 8, whereupon worm 8 and the elements following it comprise the "connection."

The driven means referred to must of course derive power from some source, and in the embodiment shown that source is the motor 14. Moreover, motor 14 is here shown as a constantly rotating electric motor. In the embodiment of the invention as actually constructed, motor 14 is an alternating current motor receiving power from any suitable source, but of course the invention is not limited to these details. Motor 14 drives a pinion 16 which is mounted on the rotor shaft of the motor. Pinion 16 meshes with and drives gears 18 and 20.

At 22 and 24, there are shown two planetary power trains of any suitable conventional design. As with all conventional planetary power trains, each of the trains 22 and 24 comprises a sun element, a planet element, and a ring element, as will be shown in greater detail below in this description. One element of each planetary train has a power input connection, another element of the planetary train has a power output connection, and the remaining element of the planetary train is connected with a brake which is actuable to impede rotation of its connected element.

In the embodiment shown in FIG. 1, the input connection for power train 22 is the gear 18, the input connection for power train 24 is the gear 20, while the output connection for power train 22 is here shown as a shaft 26 on which is mounted a gear 28 for rotation with shaft 26. As shaft 30 a gear 32 which is mounted on and rotates with shaft 30 together are the power output connection for planetary gear train 24. In the embodiment shown, gear 28 meshes with still another gear 34. As will be understood by those skilled in the art, inasmuch as gears 18 and 20 rotate in the same direction, if the internal arrangements of power trains 22 and 24 are the same, shafts 26 and 30 will rotate in the same direction when the planetary trains 22 and 24 are selectively operated for power output. However, since planetary power train 24, by means of gear 32, has to drive the gear 34 through gear 28 as an idler, it will be understood that gear 34 will turn in opposite directions depending on whether the power train 22 or the power train 24 is delivering power to its output gear 28 or 32 respectively.

In the embodiment shown in FIG. 1, means are provided drivingly connecting the power source (motor 14) and the input connections of the two power trains. More specifically, the drivingly connecting means referred to is the gear 16 which is mounted on and driven by the output shaft of motor 14. Similarly, means are provided connecting the driven means (which can be any of a shaft 36, worm 8, worm wheel 10, pinion 12, and ring gear 6) with the output connections of the two planetary power trains. Thus, gear 34 is mounted on and drives shaft 36, shaft 36 drives worm 8, etc.

Reference was made above to the desirability, in military applications, of a quick-disconnect mechanism in the steering power train. As will be seen later in the description in detail, such a disconnect has been incorporated in the train comprising worm 8, worm wheel 10, and pinion 12. In order to show all the elements of the invention in one figure, the releasable device, or disconnect, is shown in FIG. 1 as being in shaft 36, and is there shown as a simple dog clutch 38 operable by a device 40 to engage and disengage the dog clutch.

Preferably, this embodiment of the invention also includes two other elements in shaft 36. One of these elements is a flexible coupling 42, and the other is locking means for the worm 8, the locking means being shown schematically in FIG. 1 at 44 and in detail in FIG. 8, to be described below.

The two planetary power trains 22 and 24 referred to above and their connected gearing are shown in FIG. 1 as enclosed in an envelope of any suitable sort, the envelope being designated in FIG. 1 as a dotted line box 46. This assembly is lubricated by means of oil circulated by a pump 48 withdrawing oil from the enclosure 46 through a pump inlet connection 50 and discharging oil to a cooler 52, from which the oil goes through a filter 54 and back into the enclosure 46. The internal mechanics for distribution of the oil in the enclosure 46 will be well understood by those skilled in the art of lubrication, so those details are not discussed or disclosed here.

Pump 48 referred to above is driven by motor 14 through a gear 56 mounted on the pump shaft, gear 56 meshing with gear 18. The oil cooler 52 referred to above is cooled, in the embodiment here shown, by air moved by a fan 58, fan 58 being conveniently mounted on the motor output shaft, here shown as the same motor 14 as is referred to above.

The invention as shown in FIG. 1 includes an operator-operable steering control device, such as the conventional steering wheel 60. Steering wheel 60 is connected for selective actuation of either one of the brakes referred to above as associated with the planetary power trains 22 and 24, these brakes being selectively operated to effect steering of the vehicle as will be pointed out in greater detail below.

Thus, steering wheel 60 is connected in any suitable manner, shown by a dotted line connection 62, to turn a pinion 64. Pinion 64 meshes with a rack 66, and rack 66 is connected in any suitable manner, illustrated schematically by dotted line 68, to actuate a cam shown schematically at 70 to pivot about an axis 72. Cam followers consisting of rollers 74 and 76 are mounted to engage the cam face 77 of cam 70, and are connected to actuate the brakes of planetary power trains 22 and 24 respectively, those connections here shown schematically at dotted lines 78 and 80 respectively.

In a vehicle of the type contemplated here, wherein the tractor unit swings about vertical axis 2 relative to the trailing unit in order to accomplish steering, the tractor unit swings through a total of approximately 180°. This means that the tractor can be swung to either side through approximately a 90° arc. It is desirable to provide stop means to limit the swing of the tractor, and such stop means are conveniently provided on gear 6. Thus, the stop shown schematically at 82 stops the steering motion when the tractor is steered to the left, and the stop shown schematically at 84 on gear 6 stops the steering motion to the right. Stops 82 and 84, in the equipment actually built, engage a rocker arm mechanism which is directly connected to cam 70, as will be described in detail below in connection with FIGS. 3 and 4. In order to show all elements of the invention in one figure, the limit mechanism is shown schematically in FIG. 1 as comprising aforesaid stops 82 and 84 engaging a simple lever 86 which operates a rocker arm 88 by means of any suitable connection such as a link 90. Rocker arm 88 is connected by a link 92 for direct mechanical actuation of cam 70 to return the cam to its neutral position.

Figure 2:
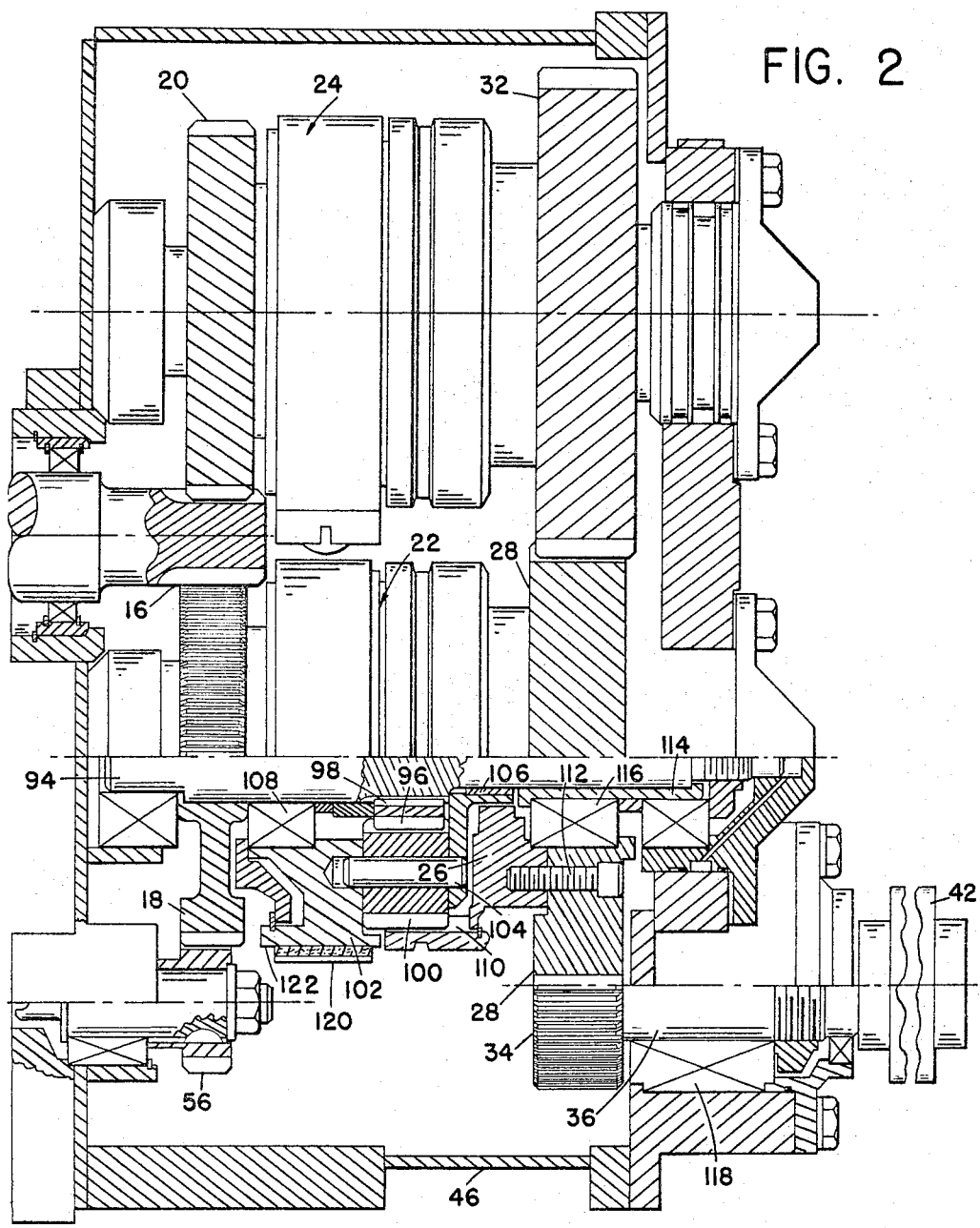
FIG. 2 is a view of the selectively reversible power train, with parts broken away and in section.

Reference will now be made to FIG. 2, wherein some of the structure is broken away and shown in section in order to disclose details not shown in schematic view, FIG. 1. Inasmuch as the two planetary power trains 22 and 24 are substantially identical, it will suffice for the purposes of this description to describe one of those power trains. In FIG. 2, it can be seen that input gear 18 shown in FIG. 1 is mounted on a shaft 94 by suitable keys or splines so as to drive the shaft as the gear turns. Shaft 94 also carries a gear 96 which it drives through the splined connection 98. Gear 96 is the sun element of the planetary gear train 22.

Sun gear 96 meshes with a planetary gear 100 which is rotatable in a planet carrier 102 by means of a shaft 104. Planet carrier 102 is freely rotatable on shaft 94 by means of a bushing 106 and an antifriction bearing 108. It will of course be understood by those skilled in the art that the planet element of planetary power train 22 includes the planet carrier 102 and one or more planetary gears such as the one shown at 100.

Planetary gear 100 (or more of them if there are more) meshes with a ring element, here shown as ring gear 110. Ring gear 110 is secured to output gear 28 by means of a threaded member 112 engaging a mounting ring which is, in functional effect, the member shown in FIG. 1 as shaft 26. Gear 28 and mounting ring 26 are freely rotatable on shaft 94 and a sleeve 114 by means of an antifriction bearing 116.

Output gear 28 of the planetary power train 22 meshes with gear 34. It may be noted here that the lower portion of FIG. 2 is an offset section, and gear 34 is behind the plane of section which passes through gear 28. Gear 34 is mounted on and drives shaft 36 which rotates in an antifriction bearing 118. Reference was made above to means provided connecting the driven means (shaft 36, worm 8, worm wheel 10, pinion 12, or ring gear 6) with the output connections of the two planetary power trains. As seen in FIG. 2, these means connecting the driven means comprise the gear 34; the flexible coupling 42 shown schematically in FIG. 1 is shown simply in elevation in FIG. 2. Any one of a number of suitable, conventional flexible coupling means may be used, so no details of the flexible coupling 42 are shown here.

Reference was also made above to the fact that one element of the planetary power train is connected with a brake which is actuable to impede rotation of its connected element. In the embodiment of the invention here shown, the planet element is adapted to be controlled by a brake. Thus a brake of the band type shown at 120 is mounted in juxtaposition to a drum 122 formed integral with planet carrier 102; thus brake 120 is capable of frictionally engaging drum 122 in order to impede rotation of the planet carrier 102. It is noted that the expression "impede rotation" is used to indicate that the rotation of planet carrier 102 may be slowed to any degree desired or may be stopped completely by the application of brake 120.

Figure 3:
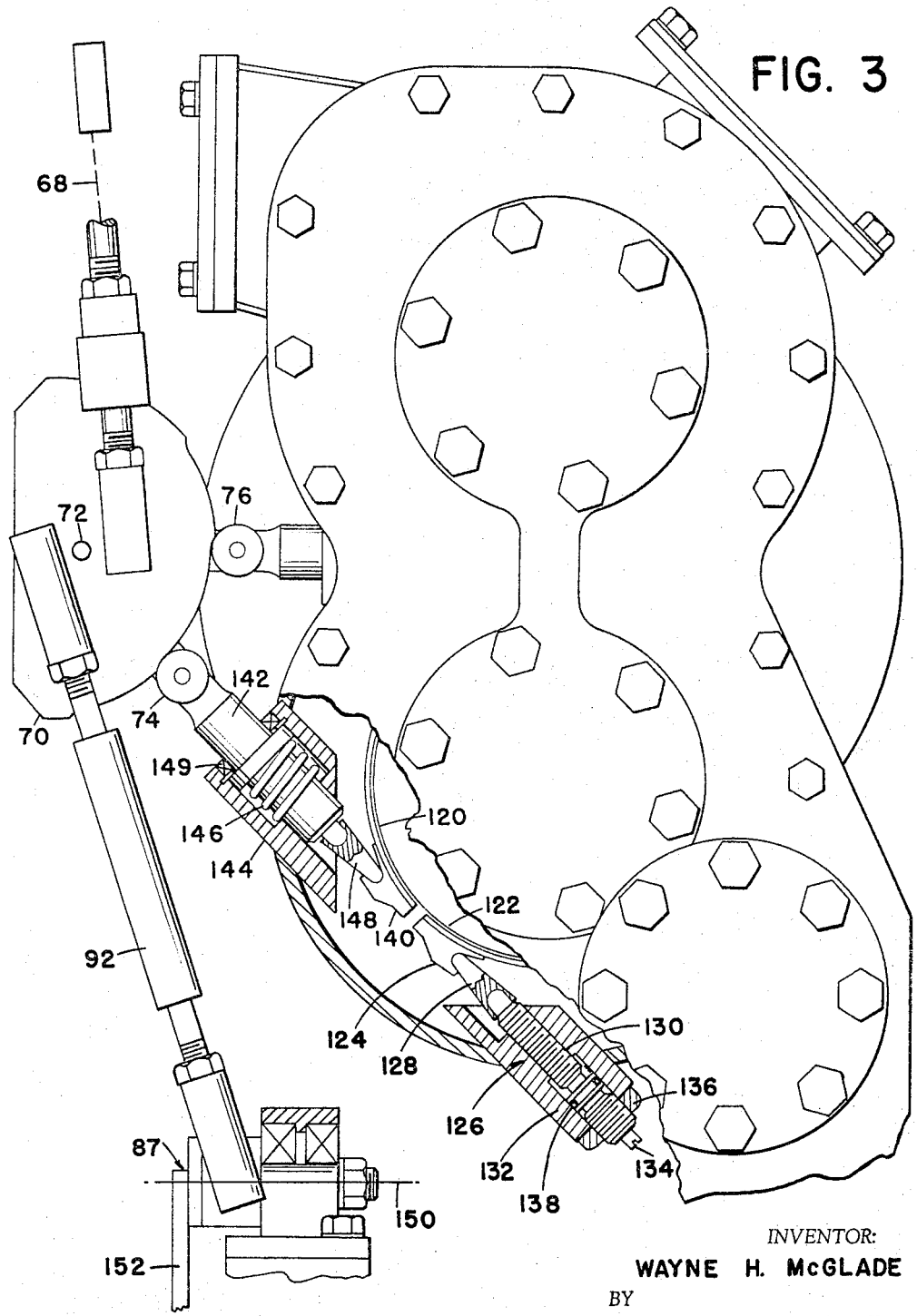
FIG. 3 is another view of the power train of FIG. 2, but showing the power train from another angle and in its relation to the operator-operable means and also in its relation to the stop means for limiting the action of the steering mechanism, in greater detail than in FIG. 1.

In FIG. 3, it can be seen that brake 120 has an end 124 which is held by an adjustable stop indicated generally at 126. Stop 126 comprises a strut 128 swivelly mounted on a screw 130 which has threaded engagement with a boss 132. A slotted end 134 permits ready adjustment of the stop. A lock nut 136 holds the screw 130 in place. Screw 130 is suitably packed as at 138 against the loss of lubricant.

The foregoing describes the "fixed" end 124 of brake 120. The other end 140 is mounted for movement toward and away from fixed end 124, by means of cam follower 74 moving in response to actuation of cam 70. For that purpose, roller 74 is mounted on a push rod 142 which is movable in a boss 144 against the bias of a spring 146. A strut 148 is swivelly mounted on the end of push rod 142 and engages brake end 140. Push rod 142 is suitably packed against the escape of lubricant, as shown schematically at 149.

It will be understood by those skilled in the art that roller 76 is similarly connected to operate the brake for planetary power train 24.

A consideration of FIGS. 3 and 4 together at this time will further explain the limit stops and their actuation to shut off steering power as the tractor approaches the 90° position in either direction of steer. It was pointed out above that the showing of this feature in FIG. 1 is schematic in order to present all major aspects of the invention, at least functionally, in one figure; thus, FIG. 1 shows a simple lever 86 connected by a link 90 with a rocker arm 88.

In the embodiment of the invention as actually constructed, a rocker arm 87 is mounted to rock about an axis 150. Arm 152 of the rocker is positioned to be engaged by either of the stops 82, 84 as the position of 90° from straight ahead is approached, and arm 154 is suitably connected with link 92 to return cam 70 to its centered position (the position shown in FIG. 3).

Figure 6:
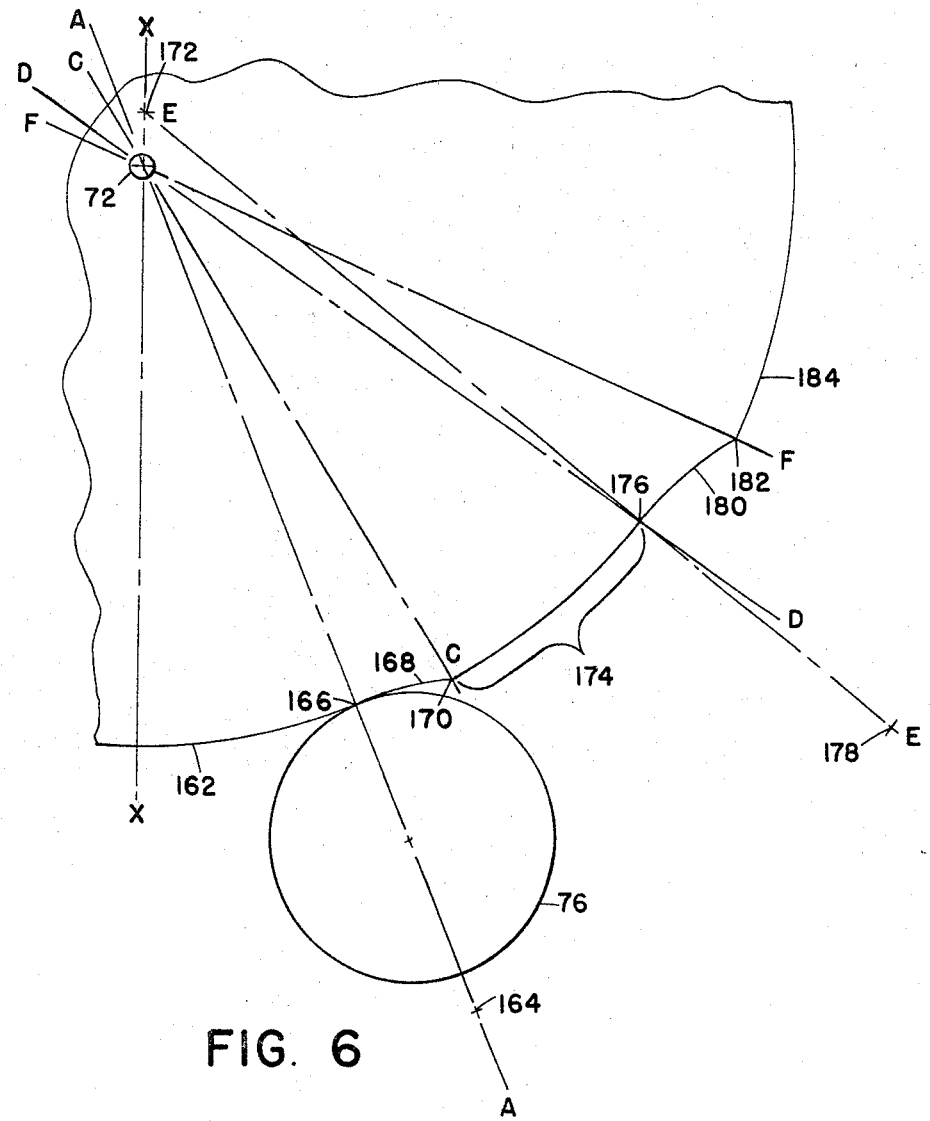
FIG. 6 is a view of a portion of the cam shown in FIG. 5 and one of the cam followers shown in FIG. 3, but on a much larger scale than FIGS. 3 and 5.

The illustration of cam 70 in FIG. 1 is entirely schematic, and reference will now be had to FIGS. 5 and 6 for a discussion in detail of cam 70 as actually constructed. It should be observed that the functional axis of symmetry of cam 70 is shown at X—X. The cam is mounted to pivot about an axis shown at 72. Holes 158 and 160 are tapped at a one inch radius from pivot axis 156, hole 158 being 34½° from X—X, and hole 160 being 17° from X—X. Hole 158 is the means by which the steering effort, through flexible cable 68, is applied to pivot cam 70; hole 160 is the means by which link 92 is connected with cam 70 to return the cam to its centered position as the 90° limit of the steering angle is approached.

For an arcuate distance of 22½° on each side of X—X, namely to lines A—A and B—B, an arc 162 is struck from pivot axis 72 as a center, and at a radius of 1.750 inches. On line A—A a center 164 is established at a distance one inch radially outward from point 166, point 166 being the intersection of arc 162 with line A—A. Center 164 then is the center for an arc 168. Arcs 162 and 168 are tangent at point 166. Arc 168 extends clockwise (about center 164) from point 166 to a point 170, where arc 168 intersects a line C—C which makes an angle of 31° 35′ with line X—X.

Above (as seen in FIG. 6) center 72 by an amount of .1625 inch on line X—X, a point 172 is located as a center for an arc 174 which extends from point 170 to a point 176 where arc 174 intersects a line D—D. Line D—D makes an angle of 55° 30′ with axis of symmetry X—X.

A line E—E is drawn through points 172 and 176; on line E—E, and one inch radially outward from the surface of cam 70, a point 178 is located as a center for an arc 180. Arcs 174 and 180 are tangent at point 176. Arc 180 extends clockwise (about center 178) from point 176 to a point 182 where arc 180 intersects a line F—F. Line F—F makes an angle of 66° with axis of symmetry X—X.

Arc 184 is struck from point 182, about point 72 as a center, for an arcuate distance sufficient to allow a suitable amount of pivotal movement of cam 70 past the point of maximum actuation of the associated cam follower (here shown as roller 76). Roller 76, in the embodiment described, has a diameter of .875 inch.

The foregoing discussion describes in detail the portion of cam 70 shown to the right (as seen in FIGS. 5 and 6) of symmetry axis X—X. It will be understood by those skilled in the art that the portion of cam 70 to the left of axis of symmetry X—X is substantially the same as the portion to the right that has been described, and accordingly, the left portion, which operates cam follower 74 (FIG. 3), need not be described in detail.

Figure 7:
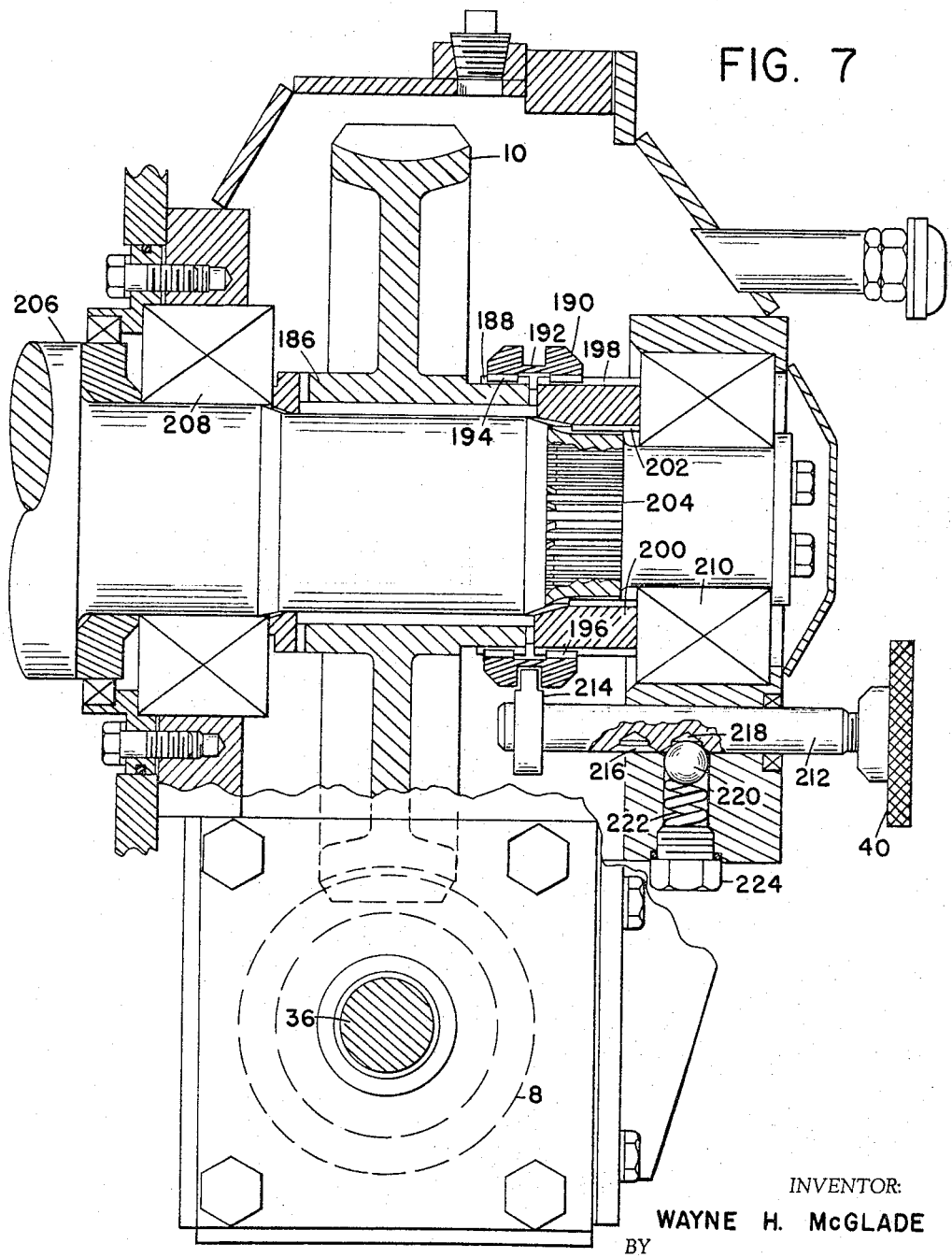
FIG. 7 is a view of a portion of the driven means connected to change the orientation of the ground engaging means; the main purpose of FIG. 7 is to disclose the means by which the driven means may be disconnected from the large gear which effects steering.

Reference has been made, above, to a quick-disconnect in the steering power train, shown schematically in FIG. 1 at 38 and shown in greater detail in FIG. 7. Worm gear 10 in FIG. 7 is shown as having a hub 186. One end of hub 186 is externally splined as shown at 188. A collar 190, grooved as at 192, carries internal splines 194 and 196. Splines 194 cooperate with splines 188, while splines 196 cooperate with external splines 198 on a sleeve 200. Sleeve 200 is internally splined at 202 to cooperate with external splines 204 on shaft 206. Shaft 206 is mounted for rotation in suitable bearings 208 and 210. The operating handle shown schematically at 40 in FIG. 1 is, in the embodiment shown, a knurled button mounted on one end of a rod 212; the other end of rod 212 carries a tongue 214 which engages groove 192.

Rod 212 is recessed as shown at 216 and 218 to receive a ball detent 220. Ball 220 is biased by a spring 222 into one of the recesses 216, 218. A threaded member 224 removably holds ball 220 and spring 222 in place.

In the discussion above of FIG. 1, reference was made to locking means for worm 8, shown schematically at 44 as a simple friction element biased by a spring into contact with the worm shaft. In many applications of the invention, the locking means could consist simply of the elements there shown. However, in other applications, a more refined locking means might be desirable, and such a locking means is shown in detail in FIG. 8.

As there shown, shaft 36 terminates in a screw thread 226 which engages the middle third (approximately) of a threaded portion 228 of a sleeve 230. At its left end, sleeve 230 carries a stop mechanism indicated generally at 232 and comprising shell 234 and end cap 236. About mid-way of the internal cavity provided by shell 234, there is a collar 238 secured to shaft 36. Because sleeve 230 and stop mechanism 232 will not rotate with shaft 36 during part of a normal operating cycle, collar 238 is preferably rotatable relative to shaft 36 in order to permit shaft 36 to rotate while stop mechanism 232 and collar 238 are held against rotation.

The left end of sleeve 230, in fact the left extremity of threaded portion 228, is provided with a snap ring 240. A preloaded spring 242 is compressed between collar 238 and snap ring 240, and a similar spring 244, similarly preloaded, is compressed between collar 238 and the end of cap 236.

The right half (approximately) of sleeve 230 is internally splined as shown at 246. Shaft 36' is provided with an external spline 248 which is slidably disposed in relation to spline 246.

Externally, sleeve 230 carries an axially short splined portion 250. An internally splined friction ring 252 is mounted on a support 254 against vertical displacement, and is held against axial displacement by guides 256 and 258. The internal splines of friction ring 252 cooperate with external splines 250 when sleeve 230 is axially oriented as seen in FIG. 8.

A brake shoe 260 is biased into contact with friction ring 252 by a spring 262. A spring seat 264 is adjustable to vary the tension in spring 262; to that end, spring seat 264 is carried on a threaded member 266 passing through any suitable bracket 268 and held in position by a lock nut 270.

In some applications, it may desirable to round off the sharp corners which are the lines of intersection showing as "points" 170 and 182, for a better "feel" of the steering by the operator. (See FIG. 6.)

*Operation*

Let it be assumed that the operator steers the vehicle in a direction to actuate cam 70 so as to operate cam follower 74. Steering effort is applied to wheel 60 and this steering effort turns steering pinion 64, causing rack 66 to move to the left. Such movement effects counterclockwise rotation of cam 70.

Reference will now be made to FIGS. 5 and 6, and especially to FIG. 6. Although cam follower 74 is not shown in FIG. 6, it will be recalled that line X—X is an axis of symmetry, and that the operation of cam 74 is substantially identical with the operation of cam 76. If we assume starting from the straight-ahead position, it will be noted that the cam follower undergoes an abrupt "rise," or actuating movement, as cam 70 rotates to change the cam follower from the position of 22½° from axis X—X to a position of 31° 35', namely from point 166 to point 170; in that much angular movement of the cam, the cam follower moves radially outward a distance of .0689 inch from the base circle represented by arc 162. Such a sharp "rise" of the cam follower at the beginning of the steering movement is desirable to take the slack out of the brake band. In moving from point 170 to point 176, the cam follower moves radially outward a distance of .0436 inch, during which time, if properly adjusted, it tightens the brake band completely (i.e., accomplishes complete lock-up). Preferably, complete lock-up is achieved approximately half way between points 170 and 176. The tightening motion that takes place during the rest of the movement of the cam (to point 176, and from point 176 to point 182) allows for wear in the brake lining, linkage, etc. In moving from point 176 to point 182, cam follower 76 moves .125 inch radially outward.

Referring to FIG. 3, it can be seen that movement of roller or cam follower 74 further away from cam pivot center 72 causes the movable end 140 of brake band 120 to approach closer to fixed end 124. As can be seen in FIG. 2, this slows down rotation of the planet carrier 102, with the result that the planet carrier becomes the reaction member even though orbiting of planetary gears 100 does not cease completely. The result is that ring gear 110 becomes the output member and begins to drive the mounting ring 26 (shown as shaft 26 in FIG. 1). Gear 28 thereupon turns and drives gear 34.

Referring again to FIG. 1, gear 34 drives shaft 36 and shaft 36 drives worm 8 through flexible coupling 42, quick-disconnect 38, and locking device 44. Worm 8 drives its worm gear 10 and, through shaft 206 (FIG. 7), steering pinion 12. Pinion 12 drives ring gear 6, which rotates about axis 2 to change the orientation of the tractor relative to line A—A.

If the steering effort thus applied is not released, turning of ring gear 6 about steering axis 2 will continue until one of the stops 82, 84 (depending on the steering direction) engages arm 152 of rocker arm 87 (FIGS. 3 and 4). Continued rotation of ring gear 6 will pivot rocker arm 87 about its pivot axis 150 and will cause link 92 to return cam 70 to its centered position.

It will be appreciated by those skilled in the art that varying degrees of tightness of brake band 120 (FIGS. 2 and 3) may be applied to vary the speed of rotation of ring gear 6, and thus the steering speed. Band tension may be varied from nothing to complete lock-up, depending upon the amount that cam 70 is turned about its pivot center 72. The operator has at all times a good "feel" of the steering operation.

In military operations, it is desirable to have means in the steering power train to disconnect the power train quickly. Such a need may occur in a variety of situations, one of which is disablement of a vehicle in a combat area. In such a situation, a recovery crew may move quickly into the area with a towing tractor to haul the disabled vehicle to a repair base. The disabled vehicle must be prepared for towing by disconnecting the steering power train. Where the disabled vehicle is in a combat area, the disconnecting operation must be performed quickly. In other words, the recovery crew should not be required to disassemble a machine element with tools, etc., because the crew could well suffer unnecessary casualties in accomplishing such a mission. The alternative is a coupling mechanism which is easily and quickly operated to uncouple the power train. Such a device is shown in FIG. 7.

To interrupt the power train, a member of the recovery crew pulls the button 40 to the right as seen in FIG. 7 (up as seen in FIG. 4). This disengages ball detent 220 from recess 218 and allows the ball to engage recess 216, during which time collar 190 moves to the right as seen in FIG. 7 a sufficient distance to disengage internal splines 194 from external splines 188. The steering power train is thus interrupted and the towed vehicle can respond to turning movements by a free swinging of the tractor about steering axis 2 (FIG. 1).

Reference was made supra to a locking device shown at 44 in FIG. 1, and shown in considerable detail in FIG. 8. Because a worm power train operates easily in transmitting torque from the worm to the worm wheel, and only with difficulty to transmit torque from the worm wheel to the worm, worm power trains tend to be self-locking. However, such a characteristic is not absolute. To assist in making the steering power train irreversible, the device of FIG. 8, described above, may be used.

A steering effort is applied to shaft 36 by rotation of the shaft, which rotation turns the threaded portion 226 on the end of shaft 36. The device will work in either direction, but let it be assumed for purposes of illustration that shaft 36 turns clockwise as viewed from the left end of FIG. 8. Since threaded portion 226 on shaft 36 is right-handed, sleeve 230 moves leftward as seen in FIG. 8. This movement disengages the external splines of splined portion 250 from the internal splines of friction ring 252. Immediately after said disengagement, collar 238 comes against shoulder 239, and further axial movement of sleeve 230 relative to shaft 36 is prevented, whereupon sleeve 230 begins to rotate with shaft 36.

The above-described axial shift leftward of sleeve 230 slides the internal splines 246 leftward relative to the splined end 248 of shaft 36', but without disengaging splines 246 and 248. Thus, as sleeve 230 begins to rotate with shaft 36, it rotates shaft 36' with it because of the engagement of splines 246, 248.

The aforesaid leftward shift of sleeve 230 relative to collar 238 compresses spring 242. When the steering effort stops, spring 242 exerts a restoring force and shifts sleeve 230 to the right as seen in FIG. 8, reengaging the splines of elements 250 and 252. This has to be done by rotating shaft 36, but this is now possible because brake band 120 (FIGS. 2 and 3) is loose.

In the "at rest" position of the parts shown in FIG. 8, brake shoe 260, being restrained against rotation as will be understood by those skilled in the art, exerts a holding force on sleeve 230 and shaft 36' which reinforces the "irreversibility" of worm power train 8, 10. Moreover, if for some reason the disengaging operation of the splines of elements 250, 252 jams, the steering effort can nevertheless drive through the locking device by slipping friction ring 252 relative to brake shoe 260. Thus, operability of the steering mechanism is assured notwithstanding the locking device.

While there is in this application specifically described one form which the invention may assume in practice, it will be understood that this form of the same is shown for purposes of illustration, and that the invention may be modified and embodied in various other forms without departing from its spirit or the scope of the appended claims.

What is claimed is:

1. Steering mechanism for a vehicle having dirigibly mounted ground engaging means, comprising:
   driven means having a connection to change the orientation of the ground engaging means relative to a fixed axis of the vehicle;
   a motor;
   first and secondary planetary power trains each having a sun element, a planet element, and a ring element, one of the elements of each train having a power input connection, another having a power output connection, and the remaining element connected with a brake actuable to impede rotation of its connected element;
   means drivingly connecting the motor and the input connections of the two power trains;
   means connecting the driven means with the output connections of the two power trains;
   an operator-operable steering control device; and
   means connecting said device for selective actuation of either of the brakes to effect steering.

2. Steering mechanism for a vehicle having dirigibly mounted ground engaging means, comprising:
   driven means having a connection to change the orientation of the ground engaging means relative to a fixed axis of the vehicle, said connection including a worm and wheel power train;
   a power source;
   selectively reversible power transmission means having right turn, left turn, and neutral operating positions and normally connecting the driven means and the power source while in neutral; and
   operator-operable means to select a right turn position or a left turn position of the power transmission means.

3. Mechanism as in claim 2, wherein the orientation-changing connection includes means to lock the worm and wheel power train when no torque is being transmitted by it.

4. Steering mechanism for a vehicle having dirigibly mounted ground engaging means, comprising:
   driven means having a connection to change the orientation of the ground engaging means relative to a fixed axis of the vehicle;
   a power source;
   selectively reversible power transmission means having right turn, left turn, and neutral operating positions and normally connecting the driven means and the power source while in neutral; and
   operator-operable means to select a right turn position or a left turn position of the power transmission means and including a cam and a cam follower for each of said turn operating positions.

5. Steering mechanism as in claim 4, in which the cam lobe has an initial abrupt rise followed by a more gradual rise for engagement of the selected cam follower.

6. Mechanism as in claim 4, wherein the orientation-changing connection includes self-locking means which permits the flow of power from the driven means through the connection and prevents the reverse flow of power.

7. Steering mechanism for a vehicle having dirigibly mounted ground engaging means, comprising:
   driven means having a connection to change the orientation of the ground engaging means relative to a fixed axis of the vehicle;
   a unidirectional power source;
   selectively reversible power transmission means having right turn, left turn, and neutral operating positions, a brake actuable for right turn steering, and another brake actuable for left turn steering, the transmission means normally connecting the driven means and the power source while in neutral; and
   operator-operable means to actuate selectively one of said brakes for steering in a selected direction.

8. Steering mechanism as in claim 7, in which the last-named means includes a cam engaging a cam follower for each said brake, the cam lobe having an abrupt rise followed by a more gradual rise for engagement of the selected cam follower.

9. Steering mechanism for a vehicle having dirigibly mounted ground engaging means, comprising:
   driven means having a connection to change the orientation of the ground engaging means relative to a fixed axis of the vehicle;
   a constantly operating unidirectional power source;
   selectively reversible power transmission means including a pair of planetary power trains each having a sun element, a planet element, and a ring element;
   means connecting one of the elements of each said train with said source;
   means connecting another element of each said train with the driven means whereby said another element of each train serves as the reaction member when no power is transmitted to the driven means; and
   operator-operable means to select the remaining element of one of the power trains and impede its rotation to drive the driven means.

10. Steering mechanism as in claim 9, in which the operator-operable means includes a cam engaging a cam follower for each of said trains, the cam lobe having an abrupt rise followed by a more gradual rise for engagement of the selected cam follower.

11. Steering mechanism for a vehicle having dirigibly mounted ground engaging means, comprising:
 driven means having a releasable connection to change the orientation of the ground engaging means relative to a fixed axis of the vehicle;
 a power source;
 selectively reversible power transmission means having right turn, left turn, and neutral operating positions and normally connecting the driven means and the power source while in neutral; and
 operator-operable means to select a right turn position or a left turn position of the power transmission means.

References Cited by the Examiner
UNITED STATES PATENTS

| | | | |
|---|---|---|---|
| 1,378,456 | 5/1921 | Hoffman | 180—79.4 |
| 1,905,952 | 4/1933 | Scott. | |
| 2,386,483 | 10/1945 | LeTourneau | 180—79.4 |
| 2,400,868 | 5/1946 | LeTourneau | 180—79.1 |
| 2,869,383 | 1/1959 | Rapp et al. | 180—79.1 |

FOREIGN PATENTS

| | | |
|---|---|---|
| 2,461,596 | 2/1949 | France. |

KENNETH H. BETTS, *Primary Examiner.*

UNITED STATES PATENT OFFICE
CERTIFICATE OF CORRECTION

Patent No. 3,272,274                            September 13, 1966

Wayne H. McGlade

It is hereby certified that error appears in the above numbered patent requiring correction and that the said Letters Patent should read as corrected below.

Column 3, line 37, for "As shaft 30 a gear 32" read -- A shaft 30 and a gear 32 --; column 9, line 60, for "secondary" read -- second --.

Signed and sealed this 29th day of August 1967.

(SEAL)
Attest:

ERNEST W. SWIDER                            EDWARD J. BRENNER
Attesting Officer                                  Commissioner of Patents